Aug. 8, 1961 F. SCHOPPE 2,995,317
EXTERNAL COMBUSTION STATO-JET ENGINE
Filed Sept. 14, 1955 3 Sheets-Sheet 2
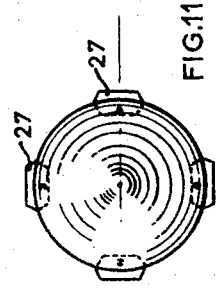
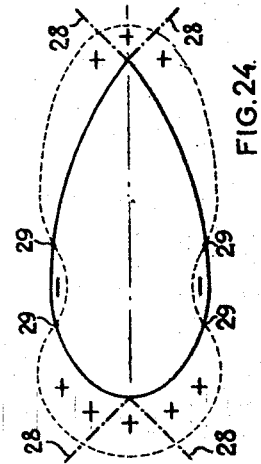
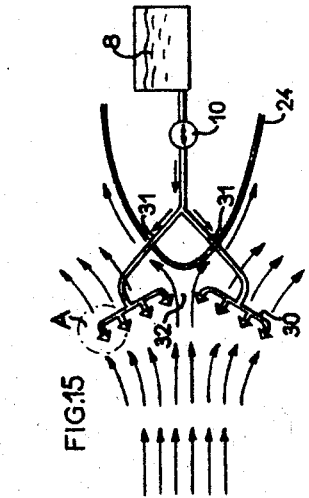
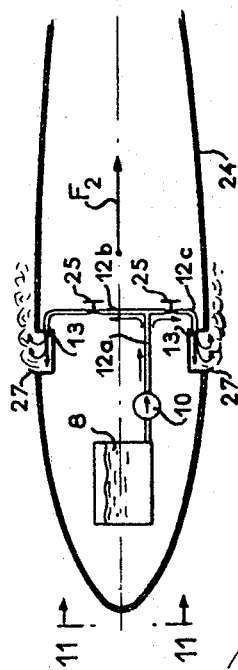
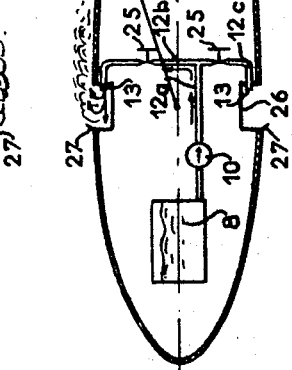
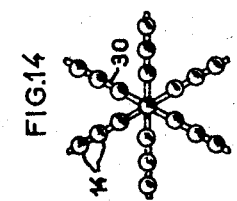
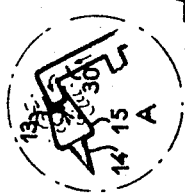
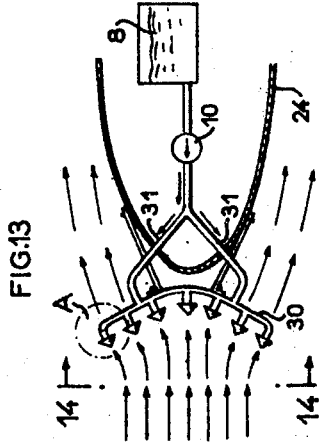
Inventor
Fritz Schoppe
by Brown & Seward
Attorneys

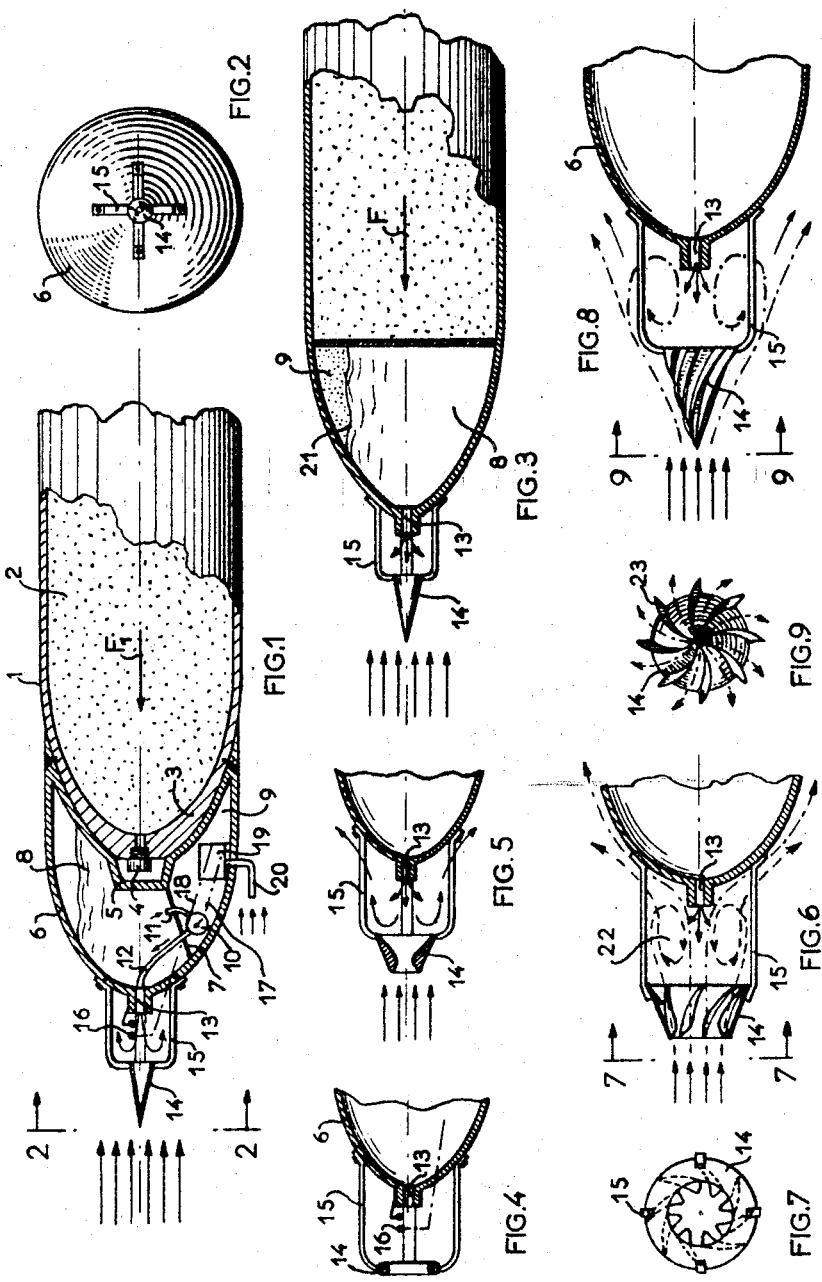

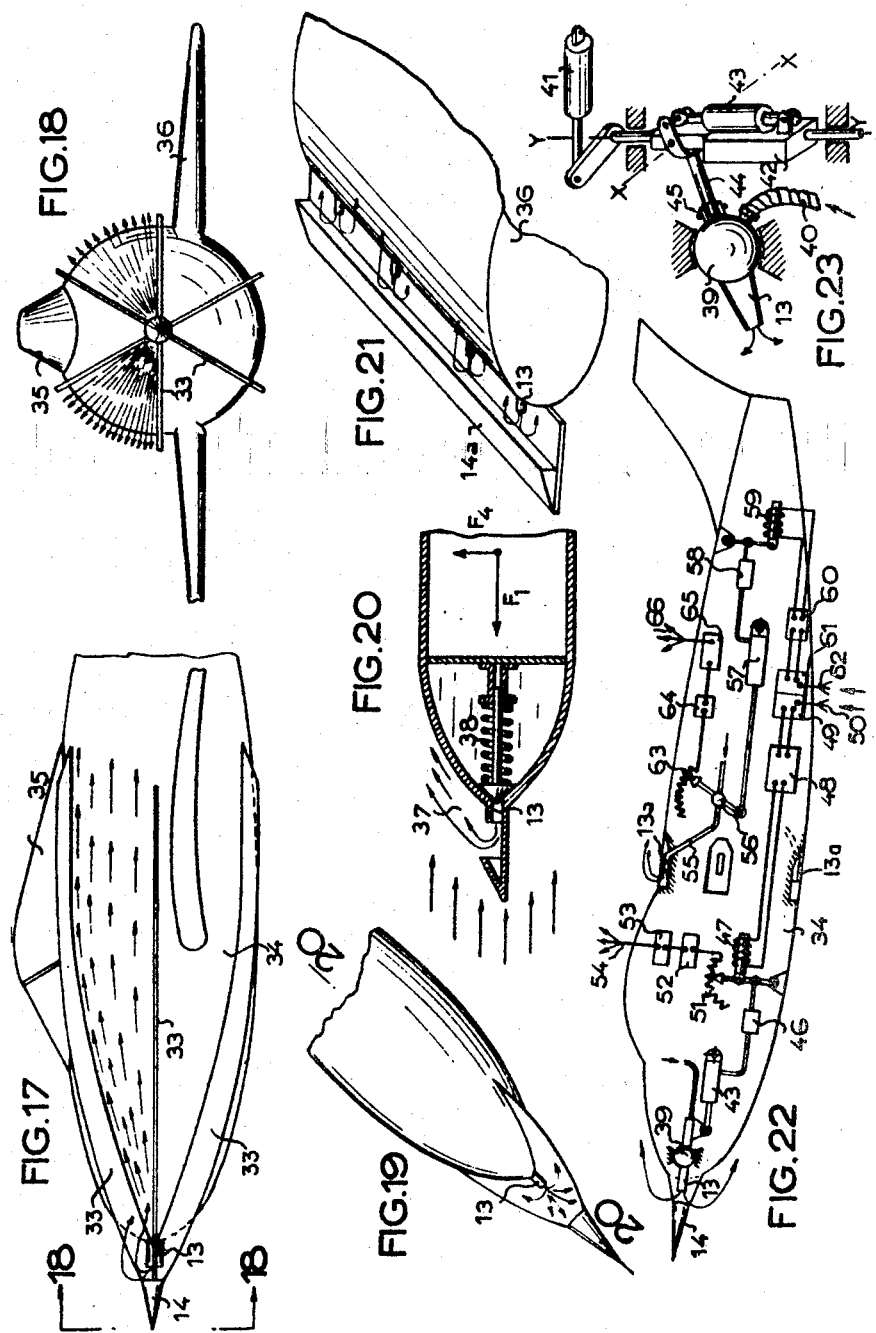

… …

United States Patent Office 2,995,317
Patented Aug. 8, 1961

2,995,317
EXTERNAL COMBUSTION STATO-JET ENGINE
Fritz Schoppe, Munich, Germany, assignor to Metallbau Semler G.m.b.H., Munich, Germany, a German company
Filed Sept. 14, 1955, Ser. No. 534,305
12 Claims. (Cl. 244—14)

This invention relates to a new and novel stato-jet engine for imparting a body propelled through air, or, conversely, a stream of air surrounding a body, with an additional force.

Stato-jet engines are already known under the name of ram-jets. The latter, however, offer a number of drawbacks. They are essentially constituted by a big size hollow casing, which considerably reduces the space available for useful load on and primarily in a body equipped therewith. The variation of their cross-section along their length must be exactly calculated for a given range of speeds, and their efficiency is highly compromised as soon as the speed exceeds this range.

It is practically impossible to design a ram-jet adapted to supersonic, as well as to subsonic speeds since the profiles are extremely different for these two speeds and, last but not least, they are exclusively capable of imparting a body with a forward thrust and do not afford in themselves any braking nor steering facilities.

An object of the invention is to provide a new method of propelling and a novel stato-jet engine based on the said method, wherein the combustion takes place externally and wherein the additional force created by the engine may be varied, at will, in intensity and/or direction.

It will be immediately obvious that the first one of these two features offer the essential advantages of:

Leaving practically the whole inner space of the body available for transporting useful loads, not requiring a particular profile as in the case of the internal combustion chamber of a ram-jet, so that the stream of air along the body takes place in optimal conditions, at any speed and so that the same engine may be used for subsonic as well as for supersonic speeds.

The second feature, moreover, permits using the additional engine, not only for accelerating but also for braking and steering purposes.

The propelling method according to the invention is based on the following remarks:

As shown in FIGURE 24, when a body is propelled through air, there is formed along its periphery a gradient of air pressure comprising zones of pressure higher than the ambient air pressure, hereafter called "positive pressure zones," located in front of/and behind the body, as indicated by the plus signs and zones of pressure lower than the ambient pressure, hereafter called "negative pressure zones," as indicated by the minus signs in the lateral regions on either side of the amidships cross-section of the body.

Applicant has experimentally found that by selectively heating suitably chosen portions of said zones, there is applied to the body an additional force, the intensity of which is a function of the absolute value of the air pressure in the heated zone portions and, hence of the relative speed of the body with respect to ambient air, and the direction of which is determined by the location of said zone portions with respect to the body. In particular, by heating air in a positive pressure zone, the body is accelerated while by heating air in a negative pressure zone, the body is braked or decelerated. On the other hand, it will be easily understood that the direction and intensity of said additional force may be adjusted at will for a given value of the initial speed by varying the amount of supply of thermic energy and the locations of the heating spots.

An external combustion stato-jet engine according to the invention thus may be used for controlling the propelling conditions of any kind of body such as a shell, a guided missile, an aerodyne, etc. through air or of a stream of air along a body. According to the direction of the additional force generated, the said control will result in accelerating, braking and/or steering the body equipped with the said engine.

An object of the invention is, therefore, to impart the body with a sufficient relative speed with respect to the surrounding air to create substantial positive and negative pressure zones around and along its outer surface, and another object of the invention is to selectively and adjustably heat, e.g. by means of fuel burners, suitably chosen portions (or portion) of said zones to thereby accelerate or brake the body and/or vary the direction of its displacement with respect to ambient air.

An external combustion stato-jet engine according to the invention may be considered as a usual ram-jet "turned inside out" in the manner of a glove finger, the usual internal combustion chamber of the engine being thus transformed into an "open combustion chamber" having only one wall constituted by the very outer surface of the body.

Now it will be easily understood that the efficiency of such an open combustion chamber will be optimum if the combustion space is strictly limited and stabilised within the positive and negative pressure zones.

It is therefore another object of the invention to provide the body with one or more flame-holders to prevent the flame of each burner from flowing outside the limits of said zones, and to stablize said flame in a well defined portion of said zones.

It has been explained hereabove that the additional force created by the external combustion stato-jet engine according to the invention may be given any desired direction.

In particular, it is possible to create, not only on the body itself but, also, if desired on particular parts thereof, such as the wings of an airplane, a super-sustaining or lifting component which permits reducing, or even in certain cases, suppressing the usual sustaining surfaces, such as wings or the like.

This lifting component offers, moreover, the advantage of being always combined with a forward or propelling component, in contradistinction with the usual lifting component of airplane wings giving rise, as known, to the so-called "induced drag."

Similarly the steering facilities afforded by the engine according to the invention permits reducing or even, in certain cases, suppressing, the usual control surfaces such as rudders, flaps or the like.

Still another object of the invention is to protect the outer surface of the body against the direct action of the flames, e.g., by means of an insulating layer or a stream of cold air which may be constituted by a portion of the incoming air threads.

Other objects will appear in the following specification, taken in connection with the annexed drawings, in which:

FIG. 1 is a longitudinal sectional view with parts broken away of the front portion of a shell provided with an external combustion stato-jet engine according to the invention, FIG. 2 is a side view taken in the direction of the arrows 2—2 of FIG. 1, FIG. 3 is a view corresponding to FIG. 1 of an alternative embodiment, FIG. 4 is a detailed view showing a modified construction of the flame-holder, FIG. 5 shows another modified construction of the same, FIG. 6 shows a constructive embodiment of the flame-holder wherein the same further imparts the flame with a whirling motion, FIG. 7 is a side view taken along the arrows 7—7 of FIG. 6, FIG. 8 shows an alternative embodiment of FIGURE 6, wherein the "whirling" action of the flame-holder is external, FIG. 9 is a side view taken along the arrows 9—9 of FIG. 8, FIG. 10 shows the use of an engine according to the invention for braking a shell, FIG. 11 is a side view taken along the arrows 11—11 of FIG. 10, FIG. 12 shows the use of the engine for vertical steering purposes, FIG. 13 shows an alternative construction, wherein the shell is provided with lines of burners arranged in a star-like pattern, FIG. 14 is a side view along the arrows 14—14 of FIG. 13, FIG. 15 shows an alternative star-like arrangement of burners offering a central channel for the incoming air threads, FIG. 16 is a detailed view of one of the burners of FIG. 15, FIG. 17 shows the application of the invention on an aerodyne, FIG. 18 is a side view taken along the arrows 18—18 of FIG. 17, FIG. 19 shows another type of aerodyne provided with a stato-jet engine according to the invention, FIG. 20 shows the use of stato-jet engine according to the invention for creating on an aerodyne a super-sustaining component, FIG. 21 is a perspective view showing the same super-sustaining arrangement used along the leading edge of an airplane wing, FIG. 22 is a diagrammatic view of a complete system for remotely controlling an airplane equipped with an engine according to the invention, FIG. 23 is a perspective detailed view showing a hydraulic control for orientating the front burner of the engine of FIG. 22 in two orthogonal planes, and FIG. 24 is a diagram illustrating the principle on which is based the operation of the external combustion stato-jet engine according to the invention.

Referring first to FIG. 1, there is shown at 1 the main body of a shell containing the usual load of explosive material 2. The ogival head 3 of the shell is provided, also as usual, with a striker 4 protected by a destructible cap 5.

The shell 1 is provided with a forward extension having, in the example shown, the same ogival shape as the head 3 of the shell. This extension comprises a hollow casing 6, the inner space of which is separated into two compartments by a partition 7. One of said compartments, 8, constitutes a fuel reservoir and the other one, 9, contains an injecting pump 10 sucking fuel from reservoir 8 through an admission pipe 11 and feeding, through another pipe 12, a nozzle 13 emerging at the very point of the ogival casing 6. According to an essential feature of the invention, a flame-holder 14, which, in the example of FIG. 1, is in the shape of a conical cap having its point oriented forwards, is rigidly supported in front of the nozzle 13 by means of brackets 15. The main function of the flame-holder 14 is to strictly limit the supply of thermic energy to the main zone of positive air pressure, in front of the body including the shell 1 and its extension 6. The engine is completed by igniting means, e.g. a sparking-plug 16 incorporated in a suitable electrical circuit (not shown). The operation of pump 10 and that of the sparking-plug 16 are controlled as shown in dot-dash-lines at 17 and 18 respectively from a suitable control box 19 responsive to air pressure in the front positive zone transmitted to the said box by a Pitot-tube 20.

With this arrangement, as soon as the shell projected by a gun has reached a determined speed, the control box 19 triggers the injecting pump 10 and the sparking-plug 16 so that fuel is injected into and ignited within the open combustion chamber formed ahead the shell, between the flame holder 14 and the outer surface of the casing 6; the flame thus produced heats the air in the positive pressure zone symmetrically around the axis of the shell, generating an additional propulsive force F1 which is oriented axially in the forward direction, so that the shell 1 is accelerated.

In FIG. 3, the inner space of the casing 6 is separated at 21 into a fuel compartment 8 and a compressed gas compartment 9 constituting a pneumatic cushion capable of feeding the nozzle 13 with fuel from compartment 8.

In FIG. 4, the flame-holder 14 has the shape of a tore-shaped ring which, while arresting the flame, provides a central passage to the incoming air threads which, as they flow along the outer surface of the casing 6, protect the same against the direct action of the flame. It is also possible to provide the said surface with a coating or a lining of heat-insulating material.

In FIG. 5, the ring 14 has a generally frustro-conical shape, while its inner space offers a converging-diverging diametral section accelerating the flow of incoming air.

In FIG. 6, the flame-holder 14 is constituted by an annular row of diverging helical blades adapted to impart the incoming air and hence, the flame with a whirling motion as shown at 22. In the alternative embodiment of FIGS. 8 and 9, another law of whirling motion is obtained by means of a flame-holder 14 provided along its outer surface with helical ribs 23, between which are formed guiding and helical passages for the incoming air threads.

In all embodiments described above, the external combustion stato-jet engine according to the invention, is used for accelerating a shell. FIG. 10 shows another embodiment wherein it is used for braking or decelerating a body 24 propelled or projected through air by suitable means (not shown). For this purpose, an injecting pump 10 feeds fuel from a reservoir 8 through pipes 12a, 12b and 12c to a pair of burners comprising nozzles 13 and igniting means (not shown) and emerging at two diametrically opposed points of the outer periphery of the body 24 in the negative air pressure zone preferably, as shown, in the immediate vicinity of the amidships cross-section of the body. In the example shown, valve means such as the cocks 25 are further provided to permit adjusting the intensity of the flames emitted by the burners 13. In this embodiment, the nozzle 13 opens within recesses 26 formed in the periphery of the body 24, and the flame-holders according to the invention are merely constituted by screens 27 projecting out of the outer surface of the body 24. With this arrangement, when the flames are equally and symmetrically distributed with respect to the body 24, there is generated a resultant force oriented along said axis and acting on said body rearwards as shown at F2 thus causing braking or deceleration of the body 24. Now, as shown in FIG. 12, if the lower burner is throttled down or even completely extinguished the resultant force F3 becomes oblique and causes elevation of the aerodyne.

Similarly, it will be easily understood that by providing a plurality of burners such as 13, suitably distributed around the periphery of the body 24, and by selectively throttling up and down one or more of the feeding pipes 12b, 12c provided to supply the said burners with fuel, it would be possible to give to the force F3 any desired orientation. Moreover, according as whether such a steering is obtained by adjusting the heating effect in a positive pressure zone or in a negative one or both, it will be possible to combine a change of direction of the body with an acceleration or with a deceleration, or again to effect such a change without varying the speed of the body.

Now, as shown in FIG. 24, the positive pressure zones offer "anti-node" areas as indicated by the dot-dash-lines at 28, while the anti-node areas in the negative pressure zones correspond to the amidships cross-section, and the "nodes" where the pressure along the body is equal to the ambient pressure are indicated at 29. It is obvious that a maximum of efficiency will be obtained by heating the air in the immediate vicinity of said anti-node areas. This is why the recesses 26 of FIG. 12 are located amidships and this may be obtained in the front positive zone as shown in FIGURES 13 to 16, by arranging a plurality of burners in a star-like pattern, each burner being provided with a flame-holder 14 as in the previously described embodiments and each arm of the star-like pattern being conveniently constituted by a distributing pipe as shown at 30, said distributing pipe being fed through suitable ducts 31 from the injecting pump 10 with fuel from reservoir 8. In the alternative construction of FIG. 15, a central passage is provided through the star-like pattern as shown at 32 so that the incoming air threads may flow directly along the outer surface of the body 24 to protect the same against the direct action of the flame in the same manner as in FIGS. 4, 5 and 6.

FIG. 16 shows the details of one of the burners of FIGURE 13 or 15. This construction is substantially the same as that of FIG. 1. It comprises a nozzle 13 fed from the distributing pipe 30 and a conical flame-holder 14 secured in front of the nozzle 13 by the brackets 15.

As mentioned in the preamble, the external combustion stato-jet engine, according to the invention, may be used for controlling the propulsion of any kind of body through air. FIGS. 17 to 23 illustrate the use of such an engine in an aerodyne. In particular, by heating exclusively in the upper portion of the front positive air pressure zone as shown in FIGS. 17 to 20, it will be possible to produce a super-sustaining component permitting considerably reducing the aspect-ratio of the wings. Such a low aspect-ratio airplane is shown in FIGS. 17 and 18 wherein 14 indicates, as previously, a front flame-holder, the flame emitted by the nozzle 13 being guided rearwardly by longitudinal fins 33 extending along the front portion of the fuselage 34: these longitudinal fins protect the pilot-cockpin 35 as well as the wings 36 from the action of the flames. Moreover, they guide the flow of the flames symmetrically on either side of the mid-vertical plane of the aircraft, thus having a lateral stabilizing effect on the latter. As clearly shown in the figures, e.g. at 37, the emission of flames is limited to the upper portion of the positive pressure zone, which gives rise, independently of the accelerating force F1, to a super-sustaining component F4.

The same super-sustaining effect may be applied to the leading-edges of the wings as shown in FIG. 21 in combination with, or independently of the main super-sustaining action on the airplane.

The device of FIG. 21 comprises a row of burners 13 equally spaced along the leading edge of the wing 36, a common flame-holder 14a extending in front of said burners in parallel relation therewith, the said flame-holder is designed, as shown, so as to deflect the flame exclusively towards the upper portion of the positive pressure zone ahead the leading edge of the wing 36.

As shown in FIG. 20, the feeding with fuel of the burner 13 may be adjusted by means of a spring-loaded valve 38 from suitable control means (not shown).

FIG. 22 shows a constructive embodiment of a complete equipment adapted to remote-control of one airplane equipped with a stato-jet engine according to the invention permitting steering the airplane not only in vertical and horizontal planes as with the usual rudders, but omnidirectionally, as well as accelerating or decelerating the said airplane, these changes of speed being combined if desired with any change of direction.

For this purpose a front burner 13 is mounted on a swivel joint 39 as shown in detail in FIG. 23. Its feeding is ensured from a fuel reservoir (not shown) through a flexible pipe 40. A first hydraulic jack 41 is provided to pivot a support 42 about an axis Y—Y. On the support 42 is mounted a second hydraulic jack 43 adapted to pivot a rocking lever 44 about an axis X—X right-angled to the axis Y—Y. Finally, the arm 44 is articulated at 45 on the burner 13. It will be easily understood that by suitably combining the actions of the jacks 41, 43, it is possible to orientate the burner 13 in any desired direction. Thus, the flame emitted by said burner limited and stabilized by the flame-holder 14 will heat selectively any desired portion of the positive air pressure zone ahead of the airplane 34 thus applying to the same additional propelling and steering forces. The engine further comprises a plurality of lateral burners 13a acting in the same manner as those described with reference to FIGS. 10 to 12 for braking and steering purposes. Each jack 41, 43 is controlled by a distributor 46 which is actuated by an electromagnetic system 47 receiving its orders, through a control box 48, from a radio-receiver 49 picking up signals 50 from any suitable control station, e.g. on the ground. On the other hand, the instantaneous positions of the burner 13 are detected by a potentiometer 51, the electrical outputs of which are fed through a control-box 52 to a radio-transmitter 53 sending signals 54 to the said control station. The feeding duct 55 of each lateral burner 13a is provided with adjustable valve means 56 actuated by a hydraulic jack 57 controlled by a distributor 58, operated by an electro-magnetic system 59 receiving its orders through a control-box 60, from a radio-receiver 61 receiving signals 62 from the control station. The instantaneous positions of the valve means 56 and hence, the instantaneous values of the intensity of the flames emitted by the relevant lateral burner are detected by a potentiometer 63, the electrical outputs of which are fed, through a control-box 64, to a radio-transmitter 65, sending signals 66 to the control station. Furthermore, a valve control such as just described, may be also provided for the front burner 13 in combination with the above described orientation control.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention.

In particular, while in all above embodiments, heating for acceleration has been described as effected exclusively in the front positive pressure zone, it is obvious that the same effect could be obtained by supplying thermic energy into the rear positive pressure zone instead of into the front one or simultaneously therewith.

What is claimed is:

1. A flying body adapted to be propelled through the air with an acquired speed sufficient to create along its outer surface a plurality of positive and negative air pressure regions, at least one of which comprises a combustion space, wherein igniting means are carried by said body outside the same to transform fuel injected into said pressure region into a flame capable of heating the air to a sufficient extent to vary the pressure of air in said region, a flame-holder serving to localize said flame within said region or regions, and wherein means are provided to control the rate of discharge of said fuel injecting means to thereby vary the intensity of said flame.

2. A flying body as claimed in claim 1 which includes means to control the direction of discharge of said fuel injecting means to thereby vary the position of said region.

3. A flying body comprising means for producing forces for effecting the movement of said body through the atmosphere, said means including, means for supplying heat to one or more regions of the flow of the atmosphere surrounding said body at which a static pressure different from that of the undisturbed atmosphere is set up as and when the desired pressure differential is reached, and means for localizing the heat supply within said region or regions, said means for supplying heat including fuel pipes which open into regions of the atmosphere surrounding the body in which an adequate static excess pressure is set up relative to the undisturbed atmosphere, in which, for exerting a braking effect, said heat supplying means include fuel pipes which open into regions of the atmosphere surrounding the body in which an adequate static negative pressure is set up relatively to the undisturbed atmosphere, in which, in order to produce transverse forces, means are provided for effecting asymmetrically with respect to the axis of the body the fuel discharge from the pipes in the regions of static excess pressure and the discharge from the pipes in the regions of static negative pressure, and fuel ignition means.

4. A flying body according to claim 3 in which the heat supply localizing means includes one or more flame holders carried by the body and arranged in the direction of relative wind in front of the region supplied with heat.

5. A flying body according to claim 4 in which each flame holder is so constructed and arranged as to set up a turbulent mixing zone rearwardly of the flame holder, relative to the wind direction.

6. A flying body according to claim 5 in which the flame holder is in the form of a plate.

7. A flying body according to claim 5 in which the flame holder is in the form of a cone.

8. A flying body according to claim 5 in which the flame holder is in the form of a ring.

9. A flying body according to claim 5 in which the flame holder is in the form of a nozzle.

10. A flying body according to claim 5 in which the flame holder is in the form of baffle elements.

11. A flying body according to claim 5 in which the flame holder is in the form of elements adapted to impart turbulence or twist to the air.

12. A flying body according to claim 5 in which the flame holder is in the form of a screened step in the body itself.

References Cited in the file of this patent

UNITED STATES PATENTS

| | | |
|---|---|---|
| 1,376,316 | Chilowsky | Apr. 26, 1921 |
| 2,624,281 | McNally | Jan. 6, 1953 |

FOREIGN PATENTS

| | | |
|---|---|---|
| 194,853 | Germany | Jan. 30, 1908 |
| 50,700 | France | Nov. 12, 1940 |
| 50,809 | France | Jan. 9, 1941 |

OTHER REFERENCES

Aviation Week, April 20, 1959, Vol. 70, No. 16; pp. 94–95.